(12) United States Patent
Hensley et al.

(10) Patent No.: US 9,223,325 B2
(45) Date of Patent: Dec. 29, 2015

(54) TEMPERATURE ESTIMATION BASED ON A FAN CONTROL SIGNAL

(75) Inventors: James D. Hensley, Rocklin, CA (US);
Douglas E. O'Neil, Auburn, CA (US);
Glenn C. Simon, Auburn, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1020 days.

(21) Appl. No.: 13/282,678

(22) Filed: Oct. 27, 2011

(65) Prior Publication Data

US 2013/0110307 A1 May 2, 2013

(51) Int. Cl.
*G05D 23/19* (2006.01)
*G06F 1/20* (2006.01)

(52) U.S. Cl.
CPC .......... *G05D 23/1932* (2013.01); *G06F 1/206* (2013.01)

(58) Field of Classification Search
None
See application file for complete search history.

(56) References Cited

U.S. PATENT DOCUMENTS

| | | | |
|---|---|---|---|
| 5,533,352 A | 7/1996 | Bahel et al. | |
| 6,735,499 B2 * | 5/2004 | Ohki et al. | 700/299 |
| 6,856,139 B2 * | 2/2005 | Rijken et al. | 324/537 |
| 6,889,511 B2 | 5/2005 | Jung | |
| 6,954,684 B2 | 10/2005 | Frankel et al. | |
| 7,138,781 B2 | 11/2006 | Murray et al. | |
| 7,271,561 B2 | 9/2007 | Chen et al. | |
| 7,275,380 B2 * | 10/2007 | Durant et al. | 62/178 |
| 7,765,825 B2 | 8/2010 | Wyatt | |
| 8,198,838 B2 * | 6/2012 | Ou | 318/268 |
| 2003/0128509 A1 | 7/2003 | Oudet | |
| 2007/0098374 A1 * | 5/2007 | Fujiwara | 388/811 |
| 2010/0113216 A1 | 5/2010 | Avny et al. | |
| 2010/0315223 A1 * | 12/2010 | Gross et al. | 340/500 |
| 2011/0075835 A1 | 3/2011 | Hill | |

FOREIGN PATENT DOCUMENTS

CN 201877083 U 6/2011

OTHER PUBLICATIONS

"4-Wire Pulse? Width Modulation (PWM) Controlled Fans," Specification, Revision 1.2, Intel Corporation, Jul. 2004, pp. 1-23, Available at: <formfactors.org/developer%5Cspecs%5CREV1_2_Public.pdf>.
"Behringer—Weird Instrument of the Week—The Teletron?," Alveromancy: Divinity Through Music, Nov. 17, 2010, 1 page, Available at: <paklebs.wordpress.com/2010/11/17/behringer-weird-instrument-of-the-week-%E2%80%93-the-teletron/>.
Dictionary.com Unabridged, "setpoint," Jul. 10, 2009, <http://web.archive.org/web/20090710123938/http://dictionary.reference.com/browse/Setpoint>.
Intel Corporation, "Intel(R) Desktop Board DB43LD," Technical Product Specification, May 2009, Order No. E64767-001US.

* cited by examiner

*Primary Examiner* — Sean Shechtman
(74) *Attorney, Agent, or Firm* — Hewlett Packard Enterprise Patent Department

(57) ABSTRACT

Example embodiments disclosed herein relate to the estimation of temperature based on a fan control signal. Example embodiments include the estimation of temperature based on a fan control signal having a value based on a temperature reading of a temperature sensor.

12 Claims, 5 Drawing Sheets

TEMPERATURE ESTIMATION BASED ON A FAN CONTROL SIGNAL

BACKGROUND

A computing device such as a desktop computer, notebook computer, computer networking device, server, or the like, may generate heat during operation. If a component of the computing device becomes too hot, the component may cease operation and/or be damaged. To prevent such overheating, a computing device may include cooling elements such as cooling fans and heat sinks.

BRIEF DESCRIPTION OF THE DRAWINGS

The following detailed description references the drawings, wherein.

DETAILED DESCRIPTION

Figure 1:
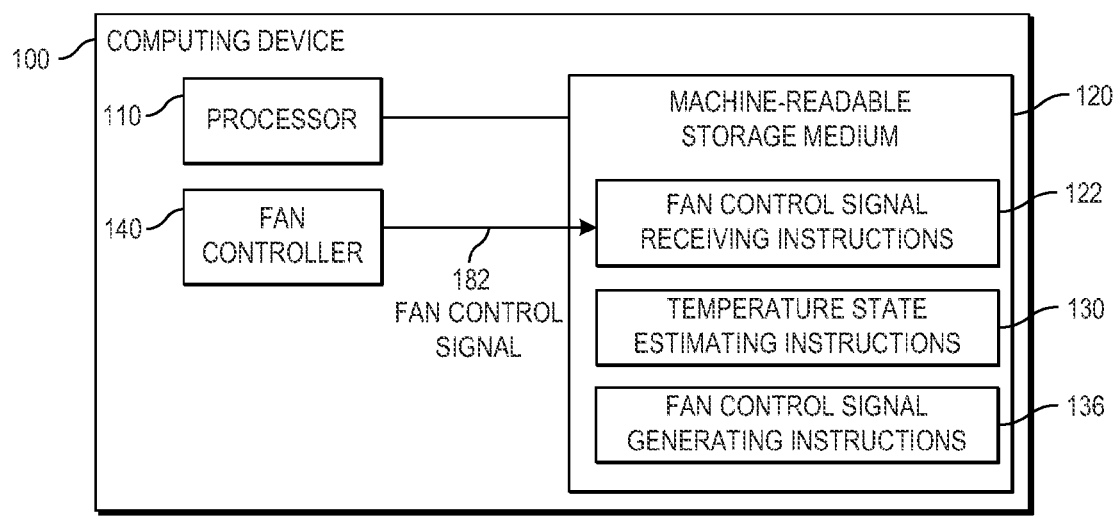
FIG. 1 is a block diagram of an example computing device to estimate a temperature state based on a fan control signal.

As noted above, a computing device may include cooling elements such as cooling fans and heat sinks to prevent overheating of components of a computing device. Some computing devices may include temperature sensors at or adjacent to heat-generating components, such as, for example, processors, memory modules, controller hubs, and the like. Such computing devices may also include at least one fan controller to receive temperature readings from the temperature sensors and operate cooling elements, such as cooling fans, based on the received temperature readings.

Additionally, a computing device may include multiple printed circuit assemblies (PCAs) and one or more fans to cool multiple components of the computing device under the control of a temperature controller for the computing device. The computing device may include all custom designed PCAs. Alternatively, to reduce the costs of producing such computing devices, a computing device may include both a custom designed PCA and at least one commodity (e.g., non-custom) PCA not specifically designed for the computing device. Such a commodity PCA may have at least one temperature sensor and at least one fan controller to generate a fan control signal to operate a connected fan based on temperature readings from the temperature sensor.

However, the temperature sensor may not be readily accessible to components external to the commodity PCA. As such, a temperature controller of a custom PCA that controls fans to cool the custom and commodity PCAs of the computing device may not be able to consider readings from the temperature sensor of the commodity PCA in determining a speed at which to operate the fans. Without access to readings of the temperature sensor, the temperature controller may rely on less precise measures of temperature and/or operate the fans of the computing device at a higher than optimal speeds based on worst-case temperatures to prevent overheating of the commodity PCA.

To address these issues, examples disclosed herein may estimate a temperature state of at least a portion of the commodity PCA based on a fan control signal output by a fan controller of the commodity PGA. In some examples, the temperature state estimate may be an estimate of a reading made by a temperature sensor of the commodity PCA. In such examples, estimates of temperature sensor readings may be considered by the temperature controller of the custom PCA in determining the cooling strategy for the computing device. In this manner, the temperature controller for the computing device may operate fans of the computing device based at least in part on estimates of readings of a temperature sensor of the commodity PCA, even though readings of the temperature sensor may not be readily accessible to the custom PCA.

In other examples, the temperature state estimate may be an estimate of a temperature state of at least a portion of the commodity PCA based on readings of multiple temperature sensors of the commodity PCA. In such examples, the temperature controller of the custom PCA may operate fans of the computing device based at least in part on temperature state estimates.

In this manner, examples disclosed herein may determine a fan speed for the computing device based on at least an estimate of a commodity PCA temperature sensor reading or an estimate of a temperature state based on readings of temperature sensors of the commodity PCA. Accordingly, examples disclosed herein may enable the temperature controller for the computing device to determine, based on at least the estimates, reduced fan speeds sufficient for cooling the commodity PCA. By reducing fan speeds, examples disclosed herein may reduce computing device power consumption as well as the amount of noise generated by computing device fans.

Referring now to the drawings, FIG. 1 is a block diagram of an example computing device 100 to estimate a temperature state from a fan control signal 182. As used herein, a "computing device" is a desktop computer, a notebook computer, computer networking device (e.g., a network switch, etc.), a server, or any other device or equipment that may include at least one cooling device (e.g., fan, etc.) for cooling at least one component of the computing device. In some examples, computing device 100 may be any of the computing devices noted above. In the example of FIG. 1, computing device 100 includes a processor 110, a machine-readable storage medium 120 including instructions 122, 130, and 136, and a fan controller 140.

As used herein, a "processor" may be at least one central processing unit (CPU), at least one semiconductor-based microprocessor, at least one graphics processing unit (GPU), at least one other hardware device suitable for the retrieval and execution of instructions stored on a machine-readable storage medium, or a combination thereof. In the example of FIG. 1, processor 110 may fetch, decode, and execute instructions 122, 130, and 136 of machine-readable storage medium 120 to implement the functionality described below. Alternatively or in addition to fetching, decoding, and executing instructions, processor 110 may include at least one integrated circuit (IC), at least one other electronic circuit, other control logic, or a combination thereof for performing some or all of the functionality of instructions 122, 130, and 136 described below.

Additionally, as used herein, a "machine-readable storage medium" may be any electronic, magnetic, optical, or other physical storage device that contains or stores executable instructions. For example, any machine-readable storage medium described herein may be any of Random Access Memory (RAM), flash memory, a storage drive (e.g. a hard disk), a Compact Disc Read Only Memory (CD-ROM), and the like, or a combination thereof. Further, any machine-readable storage medium described herein may be non-transitory. As used herein, a "fan controller" is a module including logic for controlling the operation of at least one fan of a computing device. For example, a fan controller may determine whether and at what speed to operate at least one fan based on readings of at least one temperature sensor. In some examples, the functionality of fan controller 140 may be implemented in the form of executable instructions encoded on a machine-readable storage medium, in the form of electronic circuitry, or a combination thereof.

In the example of FIG. 1, fan controller 140 may generate a fan control signal 182. As used herein, a "fan control signal" is a signal capable of driving a fan of a computing device at a speed indicated by a value of the fan control signal. In some examples, a fan control signal may be a pulse-width modulation (PWM) signal having a value represented by a duty cycle of the PWM signal. In other examples, the fan control signal may be a voltage signal where the voltage level represents the value of the fan control signal.

In some examples, fan controller 140 may generate a fan control signal 182 having a value determined by fan controller 140 based on fan control information and temperature information for at least one component of computing device 100. As used herein, "temperature information" is information, based on at least one reading of at least one temperature sensor, indicating a thermal condition of at least one component of a computing device. In some examples, the temperature information may be a value of a temperature reading or a value determined from a plurality of temperature readings from at least one temperature sensor. Additionally, as used herein, "fan control information" is information that defines a relationship between temperature information and fan control signal values. In some examples, the fan control information may include a fan control signal value for each degree that may be indicated by temperature information (e.g., a reading received from a temperature sensor) between certain minimum and maximum temperatures. In other examples, the fan control information may include a plurality of temperature information thresholds and a plurality of fan control signal values to be used by a fan controller when the determined temperature information is above one of the respective thresholds.

In some examples, fan controller 140 may utilize a reading of a temperature sensor as temperature information for determining a value for fan control signal 182 based on fan control information. In other examples, fan controller 140 may determine the temperature information from readings of a plurality of temperature sensors. For example, fan controller 140 may use an average of the readings or the greatest of the readings as the temperature information. After determining the temperature information, fan controller 140 may, for example, select a fan control signal value associated with the temperature information in the fan control information. In some examples, if the fan control information does not include a fan control signal value corresponding to the determined temperature information, fan controller 140 may select a fan control signal value in any suitable manner based on the fan control information and the temperature information. For example, fan controller 140 may interpolate a fan control signal value based on the fan control information, select the fan control signal value associated with the nearest temperature information value included in the fan control information, or select the fan control signal value corresponding to the greatest temperature information value threshold that the determined temperature information value exceeds.

In the example of FIG. 1, instructions 122 may receive fan control signal 182 from fan controller 140. After instructions 122 receive fan control signal 182, instructions 130 may estimate, based on fan control signal 182, a temperature state of at least one component of computing device 100. As used herein, a "temperature state" is information indicating thermal conditions of at least one component of a computing device. In some examples, instructions 130 may estimate the temperature state, based on the value of fan control signal 182 and temperature estimation information of computing device 100. As used herein, "temperature estimation information" is information that defines a relationship between a plurality of fan control signal values and respective temperature states of at least one component of a computing device. Moreover, as used herein, a "component" of a computing device is any physical portion of the computing device including, for example, any portion of heat-generating electronic circuitry or other heat-generating hardware of the computing device.

With knowledge of the behavior of fan controller 140 (e.g., knowledge of the fan control information used by fan controller 140), temperature estimation information may be generated that reliably defines a relationship between fan control signal values and respective temperature states of at least one component of computing device 100. As such, instructions 130 may reliably estimate the temperature state of at least one component of computing device 100 based on the value of fan control signal 182 and the temperature estimation information.

In some examples, fan controller 140 may receive readings from one temperature sensor, and the fan control information for fan controller 140 may define a relationship between readings of the temperature sensor (i.e., the temperature information) and fan control signal values. With knowledge of the fan control information, temperature estimation information that defines a relationship between a plurality of fan control signal values and respective readings of the temperature sensor (e.g., temperature states) may be stored on computing device 100. In such examples, the temperature state estimated by instructions 130 based on fan control signal 182 may be an estimate of the temperature sensor reading based on which fan controller 140 determined the value of fan control signal 182. In such examples, because the temperature sensor reading may be a reading of a temperature adjacent the temperature sensor, the temperature state estimate may be an estimate of a temperature adjacent to the temperature sensor.

In other examples, fan controller 140 may receive readings from multiple temperature sensors, and fan controller 140 may determine temperature information by combining the readings of the different sensors as described above. With knowledge of the behavior of fan controller 140, temperature estimation information that defines a relationship between fan control signal values and temperature states of at least one component of computing device 100 may be stored on computing device 100. In such examples, instructions 130 may use the temperature estimation information to estimate a temperature state based on the value of fan control signal 182. In such examples, the temperature state estimate may be an estimate of whether components adjacent the temperature sensors are receiving sufficient air flow. For example, one temperature state may indicate that components adjacent to the temperature sensors are receiving sufficient air flow, while another temperature state may indicate that at least one component adjacent one of the temperature sensors is not receiving sufficient air flow. In other examples, multiple temperature states may indicate various degrees to which air flow to the at least one component should be increased.

In some examples, instructions 130 may estimate the temperature state by selecting a temperature state in any suitable manner based on the temperature estimation information and the value of fan control signal 182. For example, if the value of fan control signal 182 is included in the temperature estimation information, then instructions 130 may estimate the temperature state by selecting the temperature state associated with the value of fan control signal 182 in the temperature estimation information. If the value of fan control signal 182 is not included in the temperature estimation information, then instructions 130 may interpolate a temperature state associated with the value of fan control signal 182 based on a plurality of fan control signal values and respective temperature states of the temperature estimation information. In other examples, instructions 130 may select a temperature state associated with the fan control signal value of the temperature estimation information that is nearest to the value of fan control signal 182. Alternatively, the temperature estimation information may include a plurality of threshold fan control signal values and corresponding temperature states, and instructions 130 may select a temperature state associated with the greatest threshold exceeded by the value of fan control signal 182.

In examples described above, the temperature estimation information may be based on the behavior of fan controller 140. In such examples, the precision of the temperature state estimates made by instructions 130 may depend upon the granularity with which fan controller 140 controls the value of fan control signal 182. For example, if fan controller 140 generates a different fan control signal value for each degree of a temperature sensor reading between certain maximum and minimum temperatures (e.g., by storing a fan control signal value for each degree or by interpolating between values), then instructions 130 may be able to estimate temperature sensor readings to the degree. In other examples, if fan controller 140 generates different fan control signal values for respective larger ranges of temperature sensor readings, then instructions 130 may estimate temperature states corresponding to the larger ranges. Additionally, in examples in which fan controller 140 determines the value for the fan control signal based on readings from multiple temperature sensors, then instructions 130 may estimate an overall temperature state indicated by the temperature sensors, and may not estimate a reading of any particular temperature sensor. Moreover, in some examples, the behavior of fan controller 140 may be programmable via the basic input/output system (BIOS) of a PCA comprising fan controller 140. In such examples, the behavior of fan controller 140 may be programmed in a manner that is beneficial for determining temperature states of at east one component of the PCA from a fan control signal generated by fan controller 140.

After instructions 130 estimate the temperature state, instructions 136 may generate a fan control signal based on at least the temperature state estimate. In some examples, computing device 100 may include at least one fan for cooling multiple components of computing device 100, and the fan control signal generated by instructions 136 may be provided to the fan to operate the fan to cool components of computing device 100. In some examples, instructions 136 may receive readings from at least one temperature sensor of computing device 100. In such examples, instructions 136 may generate the fan control signal based on the temperature state estimate and at least one reading received from at least one temperature sensor.

In examples described above, a temperature state indicating thermal conditions of at least one component of a computing device may be estimated from a fan control signal output by a fan controller. By estimating the temperature state from the fan control signal, examples described herein may obtain information on the thermal condition of components of the computing device adjacent to at least one temperature sensor that is not readily accessible to a temperature controller operating at least one fan for cooling a plurality of components of the computing device. For example, the temperature controller may be implemented on a custom PCA of the computing device and at least one temperature sensor, disposed on a commodity PCA, may not be readily accessible to the custom PCA. In some examples, the commodity PCA may have a fan controller that generates fan control signals based on readings of the temperature sensor. In such examples, by estimating the temperature state from the fan control signal, the temperature controller may consider the thermal condition of a component adjacent to the at least one temperature sensor in controlling at least one fan, even though the temperature sensor is not readily accessible to the custom PCA.

Figure 2:
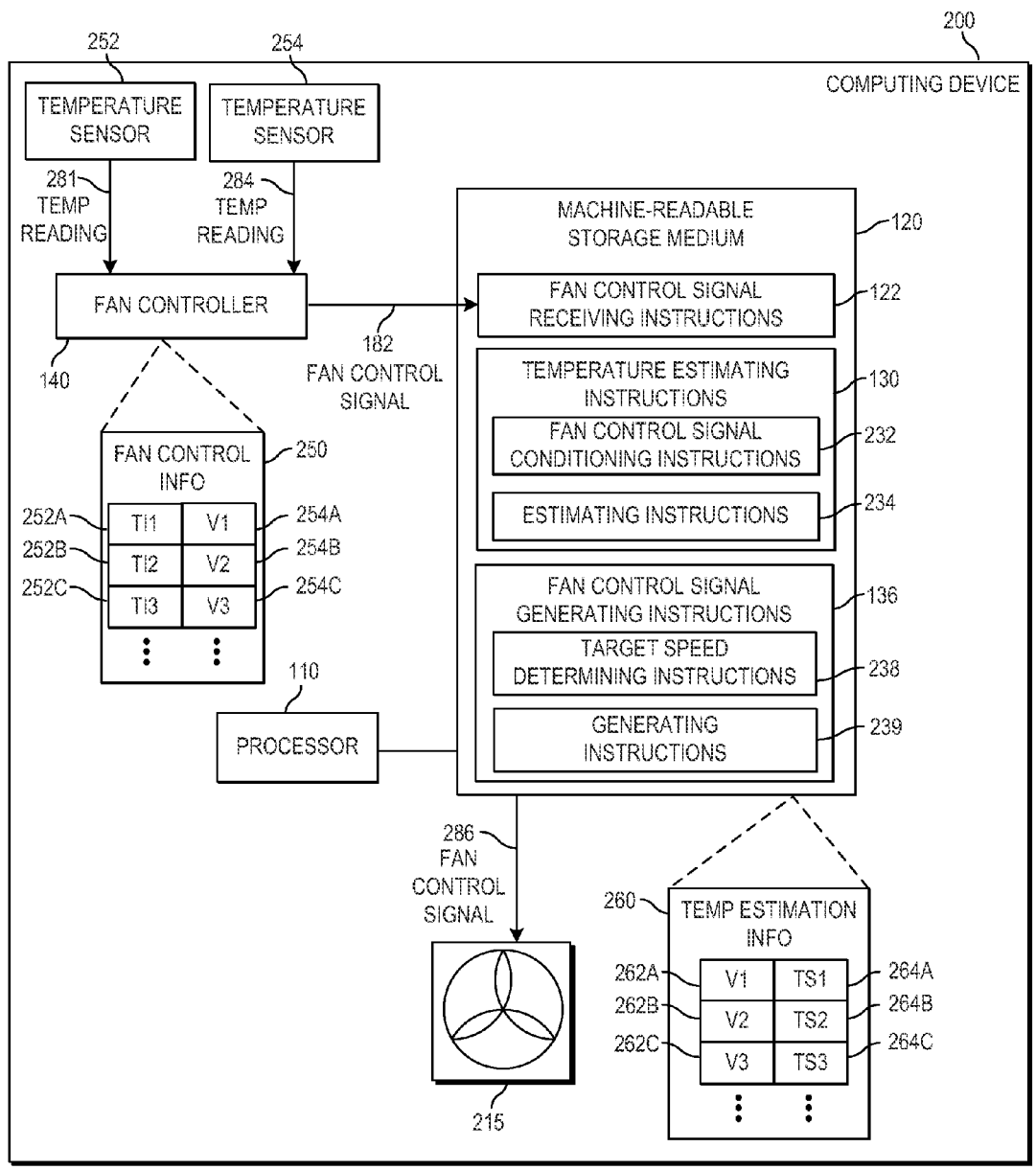
FIG. 2 is a block diagram of an example computing device to operate at least one fan in accordance with a temperature state estimated based on a fan control signal.

FIG. 2 is a block diagram of an example computing device 200 to operate at least one fan 215 in accordance with a temperature state estimated based on a fan control signal 182. Computing device 200 includes processor 110, machine-readable storage medium 120, and fan controller 140, as described above in relation to FIG. 1. Additionally, computing device 200 includes temperature sensors 252 and 254, and a fan 215.

In the example of FIG. 2, temperature sensors 252 and 254 may each take a reading of a temperature adjacent to the temperature sensor. As such, if disposed adjacent to different components of computing device 200, sensors 252 and 254 may take readings of temperatures of or adjacent to different components of computing device 200. For example, sensor 252 may take temperature readings of a component adjacent to sensor 252 (e.g., a processor) and sensor 254 may take temperature readings of another component adjacent to sensor 254 (e.g., a memory module). In some examples, sensor 252 may provide temperature readings 281 to fan controller 140, and sensor 254 may provide temperature readings 284 to fan controller 140. While the example of FIG. 2 includes two temperature sensors 252 and 254, in other examples, computing device 200 may include more of fewer temperature sensor that may provide temperature readings to fan controller 140.

As described above in relation to FIG. 1, fan controller 140 may determine a value for fan control signal 182 based on fan control information and temperature information, such as a temperature sensor reading or information determined from a plurality of temperature readings. In some examples, the temperature information may be reading 281, reading 284, or a combination of at least readings 281 and 284. Fan controller 140 may determine the temperature information as described above in relation to FIG. 1.

In the example of FIG. 2, fan controller 140 may determine a value for fan control signal 182 based on fan control information 250 and the temperature information. In some examples, fan control information 250 may include a plurality of temperature information values 252A, 252B, and 252C and a plurality of fan control signal values 254A, 254B, and 254C associated with the temperature information values. While three temperature information values and fan control signal values of fan control information 250 are shown in the example of FIG. 2, in other examples, fan control information 250 may include more temperature information values and fan control signal values. Additionally, fan control information 250 may be stored in fan controller 140 or in another storage area of computing device 200.

In some examples, after fan controller 140 determines the temperature information from at least one of temperature readings 281 and 284, fan controller 140 may select a fan control signal value associated with the determined temperature information in fan control information 250, as described above in relation to FIG. 1. For example, if fan controller 140 determines that temperature information determined from readings 281 and 284 is equivalent to a first temperature information value 252A (illustrated as "TI1" in FIG. 2), fan controller 140 may select the associated fan control signal value 254A in fan control information 250. After selecting value 254A, fan controller 140 may generate fan control signal 182 having fan control signal value 254A.

In some examples, instructions 122 may receive fan control signal 182 from fan controller 140. After instructions 122 receive fan control signal 182, instructions 130 may estimate, based on fan control signal 182, a temperature state of at least one component of computing device 200. In some examples, instructions 130 may first determine the value of fan control signal 182, and then estimate the temperature state based on the determined value.

In the example of FIG. 2, instructions 130 may include fan control signal conditioning instructions 232 and estimating instructions 234. Additionally, in some examples, computing device 200 may include temperature estimation information 260. In some examples, temperature estimation information 260 may be stored on machine-readable storage medium 120, or on another storage area of computing device 200 accessible to storage medium 120. In some examples, temperature estimation information 260 may include a plurality of fan control signal values 262A, 262B, and 262C and a plurality of temperature states 264A, 264B, and 264C associated with the fan control signal values. While three fan control signal values and temperature states are shown in the example of FIG. 2, in other examples, temperature estimation information 260 may include more fan control signal values and temperature states.

In some examples, after receiving fan control signal 182, instructions 232 may condition fan control signal 182. After conditioning fan control signal 182, estimating instructions 234 may estimate the temperature state based on at least the conditioned fan control signal and temperature estimation information 260. For example, if fan control signal 182 is a PWM signal, instructions 232 may condition fan control signal 182 by utilizing a filter to convert the PWM signal into a voltage signal. In such examples, instructions 234 may determine the value of fan control signal 182 from the voltage level of the voltage signal. After determining the value of fan control signal 182 from the conditioned signal, instructions 234 may estimate the temperature state by selecting a temperature state based on temperature estimation information 260 and the value of fan control signal 182 in any suitable manner, as described above in relation to FIG. 1. For example, if instructions 234 determine that the value of fan control signal 182 is equivalent to a fan control signal value 262A (illustrated as "V1" in FIG. 2) of temperature estimation information 260, instructions 234 may select the associated temperature state in temperature estimation information 260, which is temperature state 264A (illustrated as "TS1" in FIG. 2).

In other examples, instructions 130 may determine the value of fan control signal 182 without conditioning fan control signal 182. For example, if fan control signal 182 is a PWM signal, instructions 130 may measure the timing between edges of the PWM signal to determine a duty cycle of the PWM signal, and thereby determine the value of fan control signal 182. Alternatively, if fan control signal 182 is a voltage signal, instructions 130 may determine the value of fan control signal 182 from the voltage level of fan control signal 182. In other examples, instructions 130 may determine the value of fan control signal 182 in any other suitable manner.

After estimating the temperature state, instructions 136 may generate a fan control signal 286 for fan 215 of computing device 200. In the example of FIG. 2, instructions 136 may include target speed determining instructions 238, and generating instructions 239. In some examples, after estimating the temperature state, instructions 238 may determine a target speed for a fan 215 of computing device 200 based on at least the temperature state estimate. In some examples, instructions 238 may determine the target speed for fan 215 based on the thermal condition indicated by the temperature state estimate.

For example, if the temperature state estimate indicates that at least one component adjacent one of sensors 252 and 254 is not receiving sufficient air flow, instructions 136 may determine a target speed that is greater than a current target speed. In other examples, if the temperature state estimate indicates that the temperatures of components adjacent to sensors 252 and 254 are sufficiently low, instructions 136 may determine a target speed that is the same as or lower than a current target speed. In some examples, instructions 238 may determine the target speed based on the temperature sensor estimate and at least one temperature reading received by instructions 238. For example, if the temperature state estimate is an estimate of a reading of a temperature sensor (e.g., sensor 252), instructions 238 may determine the target speed based on the estimate of the reading of sensor 252, and the reading received from another temperature sensor.

In some examples, after determining the target speed for fan 215, instructions 239 may generate a fan control signal 286 based on the target speed. For example, instructions 239 may generate fan control signal 286 with a value corresponding to the target speed such that providing fan control signal 286 to fan 215 may drive fan 215 at the target speed.

Figure 3:
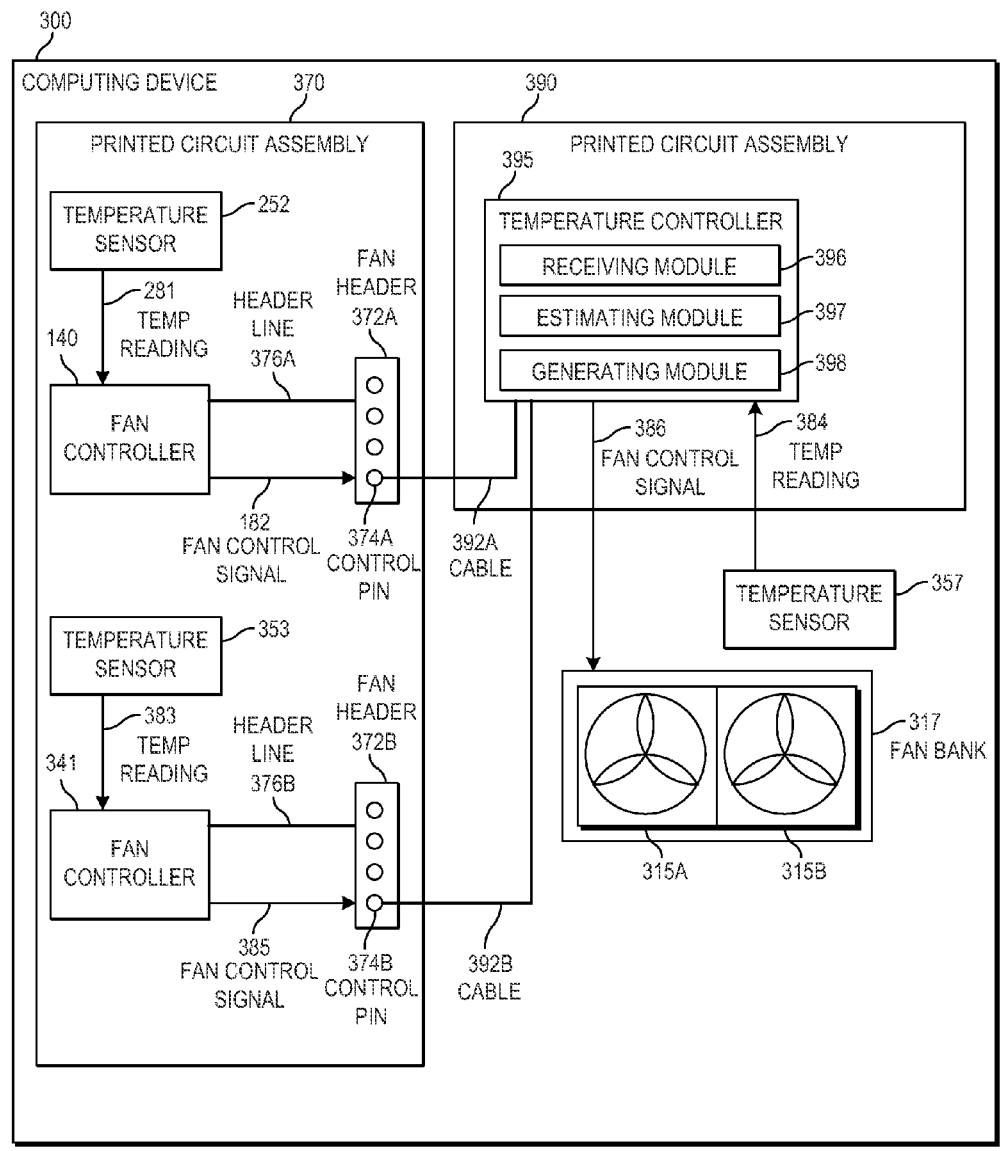
FIG. 3 is a block diagram of an example computing device to estimate a temperature state of at least a portion of a printed circuit assembly (PCA) based on a fan control signal.

FIG. 3 is a block diagram of an example computing device 300 to estimate a temperature state of at least a portion of a PCA 370 based on a fan control signal 182. Computing device 300 includes a PCA 370 including temperature sensor 252 and fan controller 140 described above in relation to FIGS. 1 and 2. PCA 370 also includes a temperature sensor 353, a fan controller 341, and fan headers 372 and 375. Computing device 300 also includes a temperature sensor 357, a fan bank 317, and a PCA 390. PCA 390 is separate from PCA 370 and includes a temperature controller 395.

In the example of FIG. 3, temperature sensor 252 may take a reading 281 of a temperature adjacent to the temperature sensor 252 and provide reading 281 to fan controller 140. In some examples, the temperature adjacent to temperature sensor 252 may be a temperature of a portion of or a component included on PCA 370. After receiving reading 281, fan controller 140 may generate fan control signal 182 having a value determined by fan controller 140 based on fan control information and at least temperature reading 281 (i.e., temperature information). In other examples, fan controller 140 may determine the value for fan control signal 182 based on the fan control information, temperature reading 281, and at least one other reading received from at least one other temperature sensor.

In the example of FIG. 3, temperature controller 395 includes modules 396, 397, and 398. In some examples, the functionality of modules 396, 397, and 398 may each be implemented in the form of executable instructions encoded on a machine-readable storage medium, in the form of electronic circuitry, or a combination thereof. As used herein, a "temperature controller" is a module including logic for estimating a temperature state from a fan control signal and controlling the operation of at least one fan of a computing device in accordance with the estimated temperature state. Accordingly, in some examples, a temperature controller may include logic for performing the functions of a fan controller in addition to logic for estimating temperature state from a fan control signal.

In the example of FIG. 3, a receiving module 396 of temperature controller 395 may receive fan control signal 182 from fan controller 140. After module 396 receives fan control signal 182, an estimating module 397 of temperature controller 395 may estimate a temperature state of at least a portion of PCA 370 based on at least fan control signal 182. For example, module 397 may estimate the temperature state from fan control signal 182 in any manner described above in relation to FIGS. 1 and/or 2 above. In the example of FIG. 3, fan controller 140 may determine a value for fan control signal 182 based on temperature reading 281 received from temperature sensor 252, which may be a reading of a temperature of a portion of PCA 370. Accordingly, in some examples, the temperature state estimated based on fan control signal 182 may be an estimate of a temperature state of a portion of PCA 370 adjacent to temperature sensor 252.

In some examples, a generating module 398 of temperature controller 395 may generate a fan control signal 386 having a value based on at least the temperature state estimate. In such examples, module 398 may generate fan control signal 386 based on at least the temperature state estimate in any manner described above in relation to FIGS. 1 and/or 2 above. For example, module 398 may generate fan control signal 386 with a value corresponding to a target speed, determined based on the estimate, such that fan control signal 386, if provided to a fan, may drive the fan at the target speed.

In some examples, module 398 may provide fan control signal 386 to fan bank 317, which, in the example of FIG. 3, includes fans 315A and 315B. In such examples, fans 315A and 315B may both operate in response to fan control signal 386 and at the speed indicated by the value of signal 386. In other examples, fan bank 317 may include more or fewer than two fans, each of which may operate in accordance with the value of fan control signal 386. In some examples, the fans of fan bank 317 may cool components of both PCA 370 and PCA 390 when operated.

In some examples, PCA 370 may also include a temperature sensor 353 that may take a reading 383 of a temperature adjacent to temperature sensor 353. In some examples, the temperature adjacent to temperature sensor 353 may be a temperature of a portion of PCA 370 different than the portion whose temperature is read by sensor 252. Sensor 353 may provide reading 383 to a fan controller 341 of PCA 370. In such examples, fan controller 341 may generate a fan control signal 385 having a value determined by fan controller 341 based on fan control information and at least reading 383 (i.e., temperature information). In other examples, fan controller 341 may determine the value for fan control signal 385 based on the fan control information, temperature reading 383, and at least one other reading received from at least one other temperature sensor.

In some examples, module 396 may receive fan control signal 385 from fan controller 341. In such examples, module 397 may estimate a temperature state of portions of PCA 370 based on fan control signals 182 and 385. For example, PCA 390 may include temperature estimation information for each of fan control signals 182 and 385. In such examples, module 397 may estimate a first temperature state based on temperature estimation information and fan control signal 182, and estimate a second temperature state based on temperature estimation information and fan control signal 385, as described above in relation to FIGS. 1 and/or 2. In such examples, module 397 may estimate, based on the first and second estimated temperature states, an overall temperature state for PCA 370, which may indicate, for example, whether any component adjacent to temperature sensor 252 or 353 is not receiving sufficient air flow. Based on the estimated overall temperature state, module 398 may determine whether to change the value of fan control signal 386 to adjust the amount of air flow received by components of PCA 370.

In the example of FIG. 3, temperature sensor 357 may take a reading 384 of a temperature adjacent to temperature sensor 357. In some examples, the temperature adjacent to temperature sensor 357 may be a temperature of a portion of PCA 390 or a portion of computing device 300 separate from PCA 370 and PCA 390. Module 396 of PCA 390 may receive reading 384 from sensor 357. In such examples, module 398 may generate fan control signal 386 based on reading 384 received from temperature sensor 357 and at least one temperature state estimated by module 397. For example, module 398 may generate fan control signal 386 based on reading 384 and at least one of a first temperature state estimate based on fan control signal 182, a second temperature state estimate based on fan control signal 385, and an overall temperature state estimate based on the first and second temperature state estimates.

In some examples, PCA 370 may include a fan header 372A to which a connector of a computing device fan may be connected. In the example of FIG. 3, fan header 372A includes a plurality of pins, including a control pin 374A. In some examples, fan controller 140 may provide a plurality of signals to fan header 372A over a header line 376A connecting fan controller 140 and fan header 372A. Additionally, header line 376A may connect fan controller 140 to fan header 372A such that fan control signal 182 is available on control pin 374A. In some examples, when a fan is connected to fan header 372A, the fan may be operated in accordance with fan control signal 182 by fan controller 140.

In the example of FIG. 3, a cable 392A electrically connects temperature controller 395 to control pin 374A on which fan controller 140 provides fan control signal 182. In such examples, by electrically connecting temperature controller 395 to control pin 374A, cable 392A electrically connects fan controller 140 of PCA 370 to temperature controller 395 of PCA 390.

In the example of FIG. 3, PCA 370 may also include a fan header 372B to which a connector of a computing device fan may be connected for operation in accordance with fan control signal 385. In such examples, fan controller 341 may provide fan control signal 385 to control pin 374B of fan header 372B via a header line 376B, and a cable 392B may electrically connect temperature controller 395 and control pin 374B such that temperature controller 395 may receive fan control signal 385 via cable 392B. In such examples, by electrically connecting temperature controller 395 to control pin 374B, cable 392B electrically connects fan controller 341 of PCA 370 to temperature controller 395 of PCA 390.

Although in the example of FIG. 3 PCA 370 includes two fan controllers connected to respective fan headers, in other examples, PCA 370 may include more or fewer fan controllers connected to respective fan headers. In such examples, temperature controller 395 may be connected to one or more of the fan headers via respective cables.

In some examples, PCA 390 may be a custom PCA for computing device 300 and PCA 370 may be a commodity PCA. In such examples, readings of temperature sensors 252 and 353 may not be readily accessible to PCA 390. To address these issues, examples described above provide an electrical connection between PCA 390 and at least one a readily accessible control pin of a fan header. In this manner, a temperature controller 395 of PCA 390 may receive a fan control signal having a value based at least in part on a reading a temperature sensor of PCA 370. In examples described above, temperature controller 395 may estimate a temperature state of at least a portion of PCA 370 from the fan control signal. In this manner, examples described above may obtain information regarding the thermal condition of at least a portion of PCA 370 from at least one readily accessible fan control signal, even though readings of temperature sensors of PCA 370 are not readily accessible to PCA 390.

Figure 4:
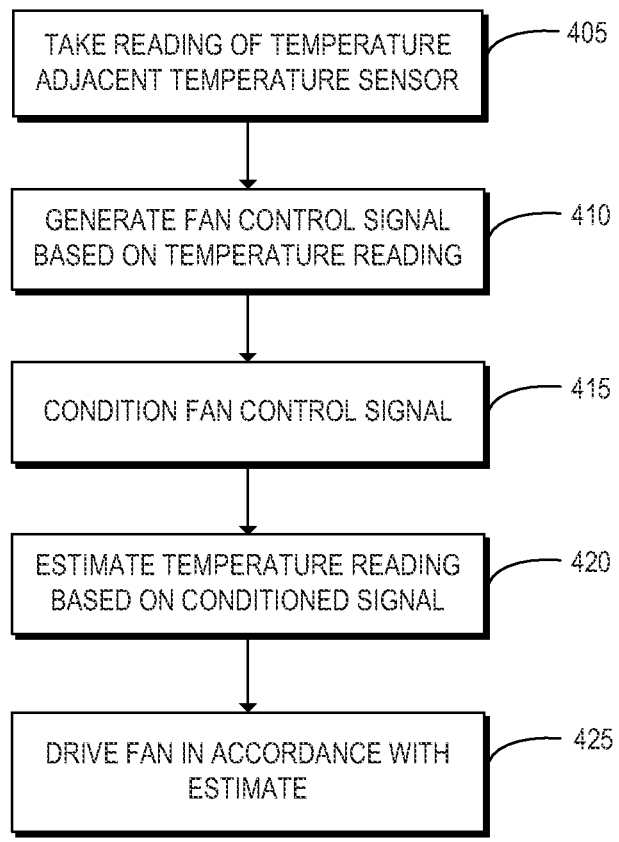
FIG. 4 is a flowchart of an example method for estimating a temperature reading based on a fan control signal.

FIG. 4 is a flowchart of an example method 400 for estimating a temperature reading based on a fan control signal. Although execution of method 400 is described below with reference to computing device 100 of FIG. 1, other suitable components for execution of method 400 can be utilized (e.g., computing device 200 or 300). Additionally, method 400 may be implemented in the form of executable instructions encoded on a machine-readable storage medium, in the form of electronic circuitry, or a combination thereof.

At 405 of method 400, computing device 100 may take a reading of a temperature adjacent a temperature sensor. In some examples, the temperature sensor may be a temperature sensor of computing device 100 disposed on or adjacent to a heat-generating component (e.g., a processor, memory module, etc.) of computing device 100. In such examples, the temperature reading may be a reading of a temperature adjacent to the heat-generating component.

After taking the temperature reading, method 400 may proceed to 410 where computing device 100 may generate a fan control signal based on the temperature reading. In some examples, the fan control signal may be generated based on the temperature reading and fan control information, as described above in relation to fan controller 140 of FIG. 1. Method 400 may then proceed to 415, where computing device 100 may condition the fan control signal. In some examples, computing device 100 may condition the fan control signal as described above in relation to instructions 232 of FIG. 2.

After conditioning the fan control signal, method 400 may proceed to 420, where computing device 100 may estimate the temperature reading based on the conditioned signal. In some examples, computing device 100 may estimate the temperature reading based on the conditioned signal as described above in relation to instructions 234 of FIG. 2. In some examples, the estimate of the temperature reading may be an estimate of a temperature state of at least a portion of computing device 100.

After estimating the temperature reading, method 400 may proceed to 425, where computing device 100 may drive at least one fan in accordance with at least the estimate of the temperature reading. In some examples, the temperature estimate may be used by computing device 100 to determine a target speed for at least one fan of computing device 100 that may be used to cool at least a portion of computing device 100 adjacent to the temperature sensor. In such examples, computing device 100 may then drive the fan at the target speed. In some examples, computing device 100 may determine the target fan speed based on the estimate as described above in relation to instructions 238 of FIG. 2.

Figure 5:
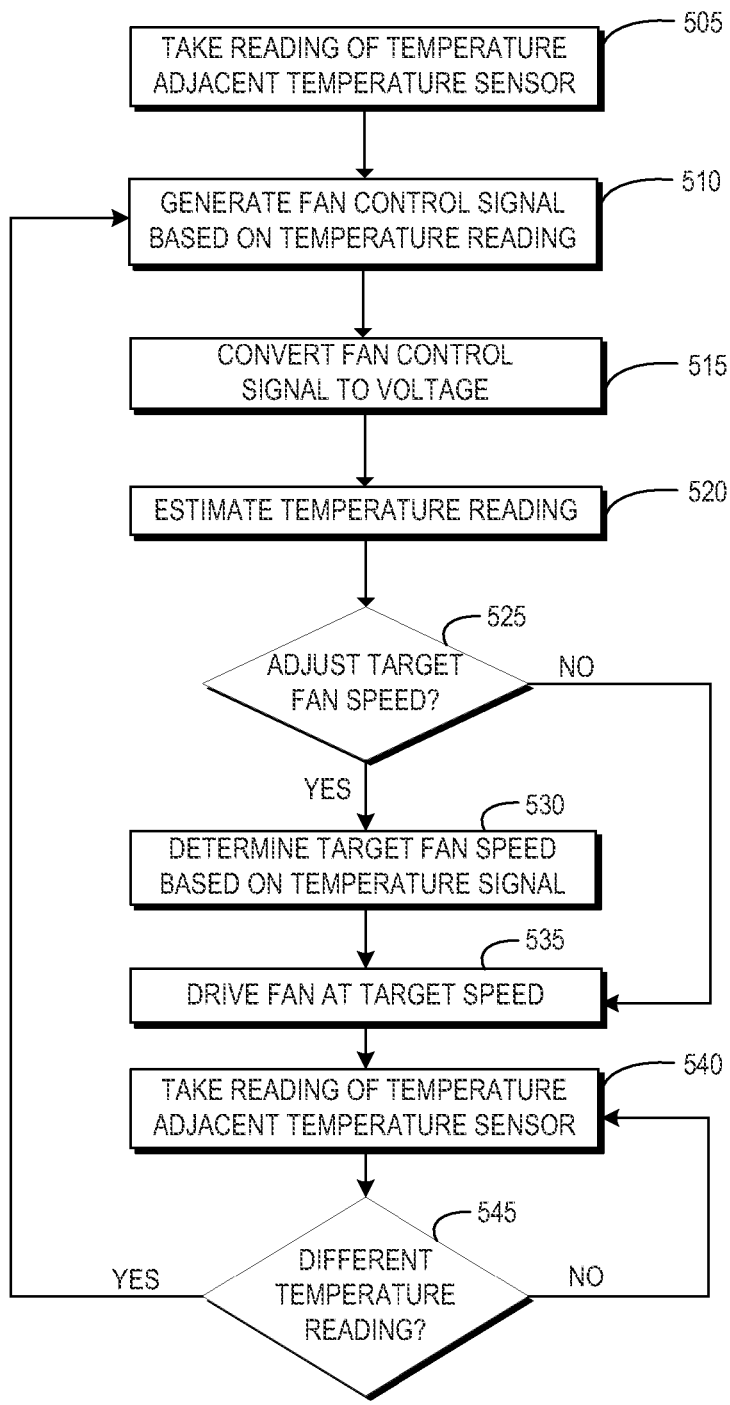
FIG. 5 is a flowchart of an example method for driving at least one fan in accordance with a temperature estimated based on a fan control signal.

FIG. 5 is a flowchart of an example method 500 for driving at least one fan in accordance with a temperature estimated based on a fan control signal. Although execution of method 500 is described below with reference to computing device 100 of FIG. 1, other suitable components for execution of method 500 can be utilized (e.g., computing device 200 or 300). Additionally, method 500 may be implemented in the form of executable instructions encoded on a machine-readable storage medium, in the form of electronic circuitry, or a combination thereof.

In the example of FIG. 5, computing device 100 may take a first reading of a temperature adjacent a temperature sensor at 505 of method 500. In some examples, the temperature sensor may be a temperature sensor of computing device 100 disposed on or adjacent to a heat-generating component (e.g., a processor, memory module, etc.) of computing device 100. After taking the first temperature reading, method 500 may proceed to 510 where computing device 100 may generate, based on the first temperature reading, a first fan control signal having a first value. In some examples, the fan control signal may be generated based on the first temperature reading and fan control information, as described above in relation to fan controller 140 of FIG. 1. In the example of FIG. 5, the fan control signal may be a PWM signal having a duty cycle indicative of the first value.

After generating the first fan control signal, method 500 may proceed to 515, where computing device 100 may condition the fan control signal by converting the fan control signal from a PWM signal to a voltage signal having a voltage indicative of the duty cycle of the PWM signal. In such examples, the voltage signal may be considered a first conditioned signal. Method 500 may then proceed to 520, where computing device 100 may estimate the first temperature reading based on the first conditioned signal, as described above in relation to instructions 234 of FIG. 2.

In the example of FIG. 5, method 500 may then proceed to 525, where computing device 100 may determine whether to adjust a target fan speed for at least one fan of computing device 100. In some examples, computing device 100 may determine whether to adjust the target fan speed based on at least the estimate of the first temperature reading. For example, computing device 100 may estimate thermal conditions of at least a portion of computing device 100 based on the estimate of the first temperature reading and at least one other temperature state estimate or temperature reading. In such examples, computing device 100 may determine to adjust the target fan speed if the thermal conditions estimated by computing device 100 are sufficiently different from the thermal conditions estimated when the target speed was last determined. In this manner, computing device 100 may refrain from changing the target fan speed based minor changes in thermal conditions.

If it is determined at 525 to adjust the target fan speed, method 500 may proceed to 530 wherein computing device 100 may determine, based on at least the estimate of the first temperature reading, a target fan speed for at least one fan of computing device 100. Method 500 may then proceed to 535, where computing device 100 may drive the fan in accordance with the target fan speed. In some examples, computing device 100 may drive the fan by providing a fan control signal to the fan, where the fan control signal has a value corresponding to the target fan speed. If it is determined at 525 not to adjust the target fan speed, method 500 may proceed to 535, where computing device 100 may drive the fan of computing device 100 at a previously-determined fan speed.

After driving the fan, method 500 may proceed to 540, where computing device 100 may take a second reading of the temperature adjacent to the temperature sensor. Method 500 may then proceed to 545, where computing device 100 may determine whether a value of the second temperature reading is different than a value of the first temperature reading. If computing device 100 determines that the second reading is not different, then method 500 may proceed to 540. If computing device 100 determines that the second reading is different than the first reading, then method 500 may proceed to 510, where computing device 100 may generate, based on the second temperature reading, a second fan control signal having a second value different than the first value of the first fan control signal.

In such examples, after generating the second fan control signal, method 500 may proceed to 515, where computing device 100 may condition the second fan control signal to generate a second conditioned signal. Method 500 may then proceed to 520, where computing device 100 may estimate the second temperature reading based on the second conditioned signal.

In the example of FIG. 5, after estimating the second temperature reading, method 500 may proceed to 525, where computing device 100 may determine, based on at least the estimate of the second temperature signal, whether to adjust the target fan speed. If the result of the determination at 525 is to adjust the target fan speed, method 500 may proceed to 530, where computing device 100 may determine an adjusted target fan speed based on at least the estimate of the second temperature reading. Method 500 may then proceed to 540, where computing device 100 may drive the at least one fan of computing device 100 in accordance with the adjusted target fan speed. If the result of the determination at 525 is not to adjust the target fan speed, then method 500 may proceed to 535, where computing device 100 may drive the fan at a previous-determined target speed.

What is claimed is:

1. A non-transitory machine-readable storage medium encoded with instructions executable by a processor of a computing device, the storage medium comprising:
   instructions to receive, from a fan controller, a first fan control signal capable of driving a fan, the fan controller to determine a value for the first fan control signal based on at least a reading of a temperature sensor;
   instructions to estimate a temperature state of at least a component of the computing device adjacent to the temperature sensor, based on the first fan control signal and temperature estimation information defining a relationship between a plurality of fan control signal values and respective readings of the temperature sensor; and
   instructions to generate a second fan control signal based on at least the temperature state estimate;
   wherein the instructions to estimate the temperature state comprise instructions to select a temperature state associated with one of the fan control signal values of the temperature estimation information that is nearest to the value of the first fan control signal.

2. The machine-readable storage medium of claim 1, wherein the instructions to estimate the temperature state comprise:
   instructions to condition the first fan control signal; and
   instructions to estimate the temperature state based on at least the conditioned first fan control signal and temperature estimation information.

3. The machine-readable storage medium of claim 2, wherein the instructions to generate the second fan control signal comprise:
   instructions to determine a target speed for at least one fan of the computing device based on at least the temperature state estimate; and
   instructions to generate the second fan control signal based on the target speed.

4. The machine-readable storage medium of claim 3, wherein the temperature state estimate is an estimate of a temperature adjacent to the temperature sensor.

5. A computing device, comprising:
   a first printed circuit assembly (PCA) comprising:
      a first temperature sensor to take a first reading of a temperature adjacent to the first temperature sensor; and
      a first fan controller to generate a first fan control signal capable of driving a fan and having a value based on at least the first temperature reading;
   a second PCA comprising:
      temperature estimation information that defines, based on the behavior of the first fan controller, a relationship between a plurality of fan control values and respective temperature states of at least one component of the computing device; and
      a temperature controller to:
         estimate a temperature state of at least a portion of the first PCA based on at least the first fan control signal and the temperature estimation information; and
         generate a second fan control signal having a value based on at least the temperature state estimate; and
   a cable electrically connecting the temperature controller of the second PCA to a pin of a fan header of the first PCA on which the first fan controller is to provide the first fan control signal, such that the temperature controller is to receive the first fan control signal from the pin of the fan header via the cable.

6. The computing device of claim 5, wherein the first PCA further comprises:
   a second temperature sensor to take a second reading of a temperature adjacent to the second temperature sensor; and
   a second fan controller to generate a third fan control signal having a value based on at least the second temperature reading, wherein the temperature controller is to estimate the temperature state based on at least the first and third fan control signals.

7. The computing device of claim 6, further comprising:
   a third temperature sensor separate from the first PCA;
   at least one fan, each to operate in accordance with the value of the second fan control signal, wherein the temperature controller is further to generate the second fan control signal based on at least the temperature state estimate and a temperature reading of the third temperature sensor.

8. A method of a computing device, the method comprising:
   taking a first reading of a temperature adjacent a temperature sensor;
   generating, based on the first temperature reading, a first fan control signal capable of driving a fan and having a first value;
   conditioning the first fan control signal to generate a first conditioned signal;
   estimating the first temperature reading based on the first conditioned signal and temperature estimation information, stored on the computing device, that defines a relationship between a plurality of fan control signal values and respective readings of the temperature sensor, by selecting a temperature state associated with one of the fan control signal values of the temperature estimation information that is nearest to the value of the first fan control signal; and driving at least one fan in accordance with at least the estimate of the first temperature reading.

9. The method of claim 8, wherein the first fan control signal is a pulse-width modulation (PWM) signal having a duty cycle indicative of the first value, and conditioning the first fan control signal to generate the first conditioned signal comprises:

converting the first fan control signal to a voltage signal having a voltage indicative of a duty cycle of the PWM signal, wherein the voltage signal is the first conditioned signal.

10. The method of claim 8, wherein driving the at least one fan in accordance with at least the estimate of the first temperature reading comprises:

determining, based on at least the estimate of the first temperature reading, a target fan speed for at least one fan; and driving the at least one fan in accordance with the target fan speed.

11. The method of claim 10, further comprising:

taking a second reading of the temperature adjacent to the temperature sensor;

generating, based on the second temperature reading, a second fan control signal having a second value different than the first value, if a value of the second temperature reading is different than a value of the first temperature reading;

conditioning the second fan control signal to generate a second conditioned signal; and estimating the second temperature reading based on the second conditioned signal.

12. The method of claim 11, further comprising:

determining, based on at least the estimate of the second temperature signal, whether to adjust the target fan speed;

determining an adjusted target fan speed based on at least the estimate of the second temperature reading, if the result of the determination is to adjust the target fan speed; and driving the at least one fan in accordance with the adjusted target fan speed.

* * * * *